(12) United States Patent
Uotani (10) Patent No.: US 6,752,615 B2
(45) Date of Patent: Jun. 22, 2004

(54) FORMING MOLD FOR A LENS SHEET (75) Inventor: Yukifumi Uotani, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 72 days.

(21) Appl. No.: 10/010,436

(22) Filed: Nov. 8, 2001

(65) Prior Publication Data
US 2002/0060377 A1 May 23, 2002

(30) Foreign Application Priority Data

Nov. 22, 2000 (JP) ..................................... P2000-355359

(51) Int. Cl.[7] .............................................. B29D 11/00
(52) U.S. Cl. ........................ 425/215; 425/111; 425/127; 425/810
(58) Field of Search ............................... 425/111, 127, 425/215, 363, 406, 808

(56) References Cited

U.S. PATENT DOCUMENTS 2,733,494 A * 2/1956 Bryer et al. .................. 425/84

FOREIGN PATENT DOCUMENTS

| JP | 64086102 | | 3/1989 |
| JP | 03075702 A | * | 3/1991 |
| JP | 03114002 A | * | 5/1991 |
| JP | 03128212 A | * | 5/1991 |
| JP | 06067002 | | 3/1994 |
| JP | 06118206 A | * | 4/1994 |
| JP | 07148751 | | 6/1995 |

* cited by examiner

Primary Examiner—James P. Mackey
Assistant Examiner—Donald Heckenberg
(74) Attorney, Agent, or Firm—Ladas & Parry

(57) ABSTRACT

A forming mold for a lens sheet is to be used for molding ionizing radiation curing type resin into the lens sheet by applying the resin in the form of liquid on the upper surface of the forming mold, placing a substrate on the resin and pressing the substrate and the resin against the forming mold from a pressing-starting side of the forming mold to a pressing-finishing side thereof by means of a pressing roller. The forming mold comprises a mold body and a receiving member. The receiving member receives a superfluous amount of the ionizing radiation curing type resin. The receiving member is provided on at least pressing-finishing side of a periphery of the mold body.

2 Claims, 11 Drawing Sheets

FORMING MOLD FOR A LENS SHEET

BACKGROUND OF THE INVENTION

1. Field of the Invention

The present invention relates a forming mold for a lens sheet such as a Fresnel lens sheet and a method for manufacturing such a forming mold.

2. Description of the Related Art

Japanese Laid-Open Patent Application Nos. S64-86102, H6-67002 and H7-148751 disclose a method for manufacturing various kinds of lens sheet such as Fresnel lens sheets, lenticular lens sheets or the like, which are to be used for a transmission type screen for a projection TV.

Description will be given below of the above-mentioned conventional method for manufacturing a lens sheet with reference to FIG. 7. First, ultraviolet ray curing type resin in the form of liquid is applied on a forming mold 2 on a pressing-finishing side thereof to form an uncured resin pool 3 (see FIG. 7(A)). A sheet-shaped substrate 4 is placed on the forming mold from above the uncured resin pool 3 of the ultraviolet ray curing type resin (see FIG. 7(B)). Then, the substrate 4 and the forming mold 2 are pressed together by means of a pair of pressing rollers 5a, 5b so as to flatten the uncured resin pool 3 to form a laminate structure of the substrate 4 and the ultraviolet ray curing type resin 3, while excluding bubbles from the ultraviolet ray curing type resin 3 (see FIGS. 7(C) and 7(D)). Then, ultraviolet ray 7 is irradiated on the ultraviolet ray curing type resin 3 through the substrate 4 to cure it (see FIG. 7(E)). Then, the cured resin 3 is peeled together with the substrate 4 from the forming mold 2, thus manufacturing a lens sheet 1.

Figure 7A:
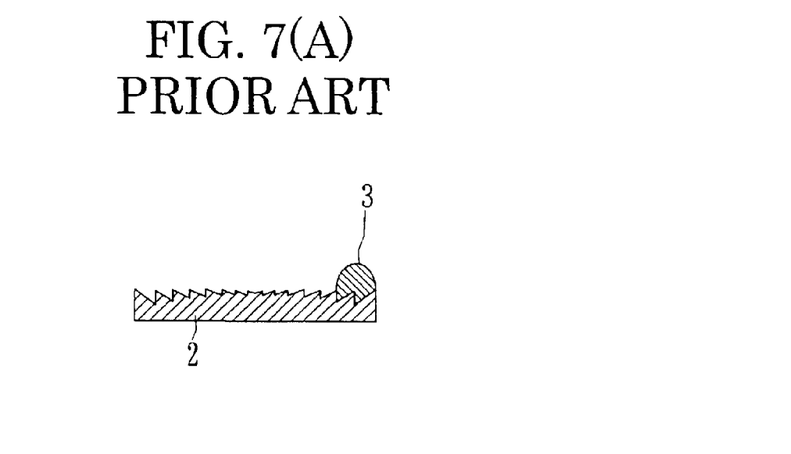
FIGS. 7(A) to 7(F) are schematic views illustrating steps for manufacturing the lens sheet in accordance with the prior art
Figure 7B:
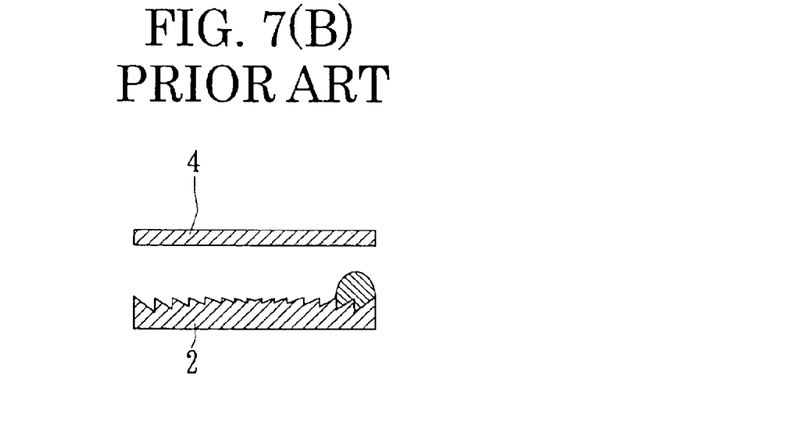
Figure 7C:
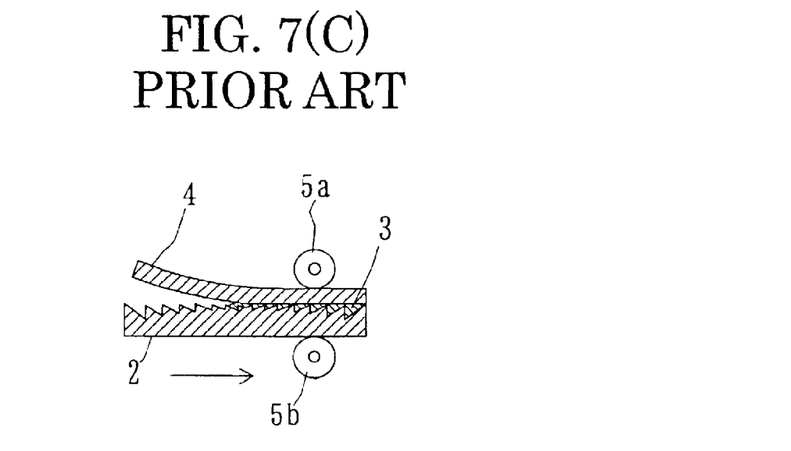
Figure 7D:
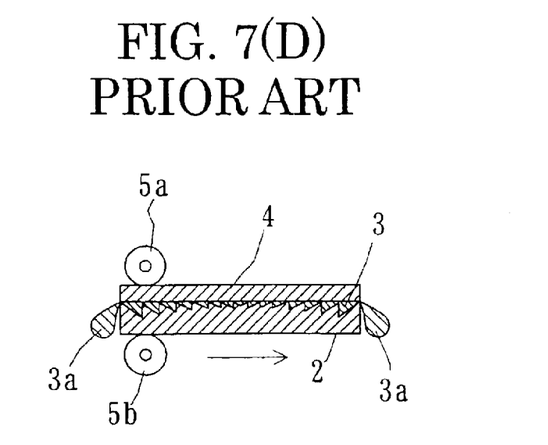
Figure 7E:
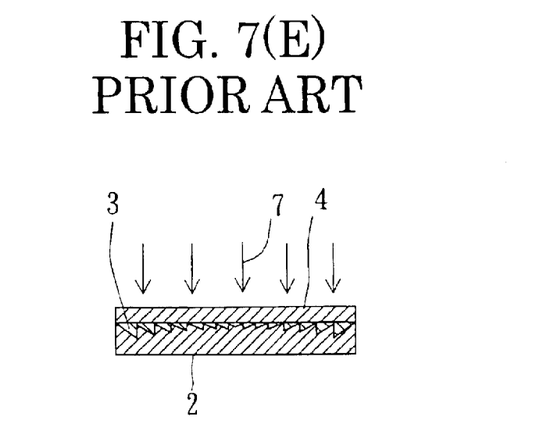
Figure 7F:
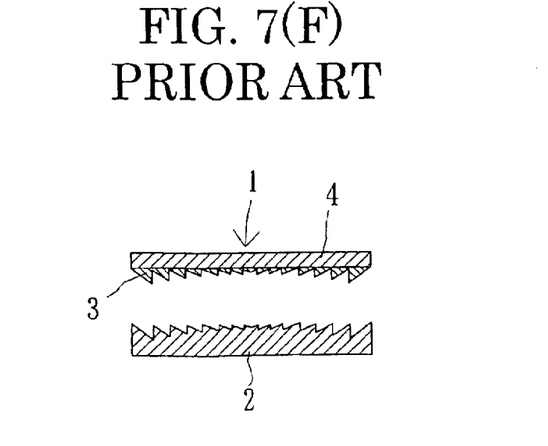

In such a conventional method, pressing the substrate 4 and the forming mold 2 during the lamination step as shown in FIGS. 7(C) and 7(D) causes a superfluous amount of resin 3a of the ultraviolet ray curing type resin 3 to flow from the periphery of the forming mold 2, thus sagging downward from the forming mold 2 as shown in FIG. 7(D). Such a superfluous amount of resin 3a may be left on the periphery of the forming mold 2 even when the lens sheet 1 as the finished product is peeled from the forming mold 2. The above-mentioned superfluous amount of resin 3a may adhere on a molding surface of the forming mold 2 when manufacturing the new lens sheet with the use of the above-mentioned forming mold 2 or be entrapped into the ultraviolet ray curing type resin 3 as newly applied on the molding surface, thus deteriorating formability of the lens sheet 1. The superfluous amount of resin 3a may drop in an uncured state from the forming mold 2 on a traveling passage for the forming mold 2 and the other equipment, making them dirty and disturbing transfer of the forming mold 2.

SUMMARY OF THE INVENTION

An object of the present invention is therefore to provide a forming mold for a lens sheet, by which the above-mentioned problems can be solved, and a method for manufacturing such a forming mold.

In order to attain the aforementioned object, a forming mold of the present invention for a lens sheet, which is to be used for molding ionizing radiation curing type resin into the lens sheet by applying said resin in a form of liquid on an upper surface of said forming mold, placing a substrate on said resin and pressing said substrate and said resin against said forming mold from a pressing-starting side of said forming mold to a pressing-finishing side thereof by means of a pressing roller, comprises:

a mold body; and a receiving member for receiving a superfluous amount of the ionizing radiation curing type resin, said receiving member being provided on at least said pressing-finishing side of a periphery of said mold body.

According to the above-mentioned features of the first aspect of the present invention, the receiving member receives a superfluous amount of resin, which flows outside between the forming mold and the substrate. The superfluous amount of resin, which is received by the receiving member, is cured together with the resin as applied on the mold body so that the superfluous amount of resin cured is peeled from the forming mold together with the lens sheet as the finished product. It is therefore possible to prevent formation of the next lens sheet from being disturbed by the superfluous amount of resin and a traveling passage for the forming mold and the other equipment from becoming dirty.

In the second aspect of the present invention, said mold body may comprise a molding plate and a supporting plate on which said molding plate is secured. According to such a feature, the supporting plate and the receiving member impart a sufficient rigidity to the molding plate, thus reinforcing the molding plate.

In the third aspect of the present invention, a gap between said mold body and said receiving member may be filled with filler. According to such a feature, the filler prevents a superfluous amount of resin from coming into the gap between the mold body and the receiving member. This prevents the superfluous amount of resin from being left inappropriately on the forming mold after the lens sheet is peeled therefrom.

In the fourth aspect of the present invention, said receiving member may have a portion, which comes into contact with said mold body, said portion has a downward inclined upper surface in a direction from said mold body to said receiving member. According to such a feature, it is possible to cause the superfluous amount of resin to flow smoothly on the receiving member.

In the fifth aspect of the present invention, said mold body may have a portion, which comes into contact with said receiving member, said portion having a downward inclined upper surface in a direction from said mold body to said receiving member. According to such a feature, it is possible to cause the superfluous amount of resin to flow smoothly on the receiving member.

In order to attain the aforementioned object, the method of the sixth aspect of the present invention for manufacturing a forming mold for a lens sheet, comprising the steps of:

cutting four sides of a blank body having a basic plane in a direction perpendicular to said basic plane to prepare a mold body having on a periphery thereof four perpendicular side surfaces; and securing a receiving member on at least one of said four perpendicular side surfaces of said mold body to prepare a mold unit, said one of said four perpendicular side surfaces being located on a pressing-finishing side.

According to the above-mentioned features of the sixth aspect of the present invention, the four sides of the blank body are cut in the direction perpendicular to the basic plane of the blank body so as to provide the mold body having the four perpendicular side surfaces. It is therefore possible to make a gap between the perpendicular side surface of the mold body and the receiving member small, thus preventing the superfluous amount of resin from being left on the forming mold.

In the seventh aspect of the present invention, said mold body may comprise a molding plate and a supporting plate on which said molding plate is adhered. According to such a feature, the supporting plate and the receiving member impart a sufficient rigidity to the molding plate, thus reinforcing the molding plate.

In the eighth aspect of the present invention, the method may further comprise subjecting said mold unit to a cutting work to form a downward inclined upper surface in a direction from said mold body to said receiving member at a connection portion of said mold body and said receiving member. According to such a feature, it is possible to cause the superfluous amount of resin to flow smoothly and rapidly on the receiving member.

In the ninth aspect of the present invention, the method may further comprise applying filler in a gap between said mold body and said receiving member prior to said securing of said receiving member. According to such a feature, it is possible to seal the gap between the mold body and the receiving member in an appropriate manner.

In the present invention, the "forming mold" means a device for forming or molding a lens sheet and includes a forming die.

DETAILED DESCRIPTION OF THE PREFERRED EMBODIMENTS

Now, embodiments of the present invention will be described in detail below with reference to the accompanying drawings.

Figure 1:
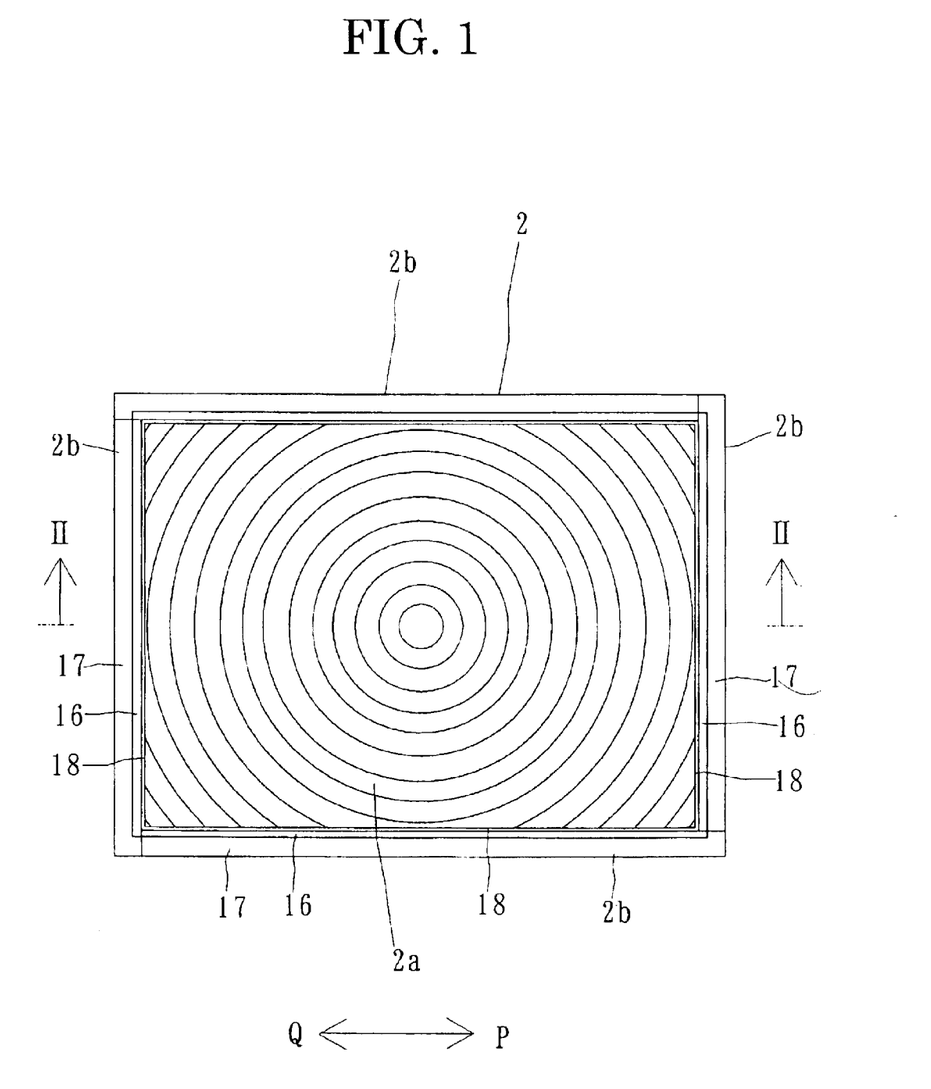
FIG. 1 is a plan view of a forming mold of the present invention for a lens sheet.
Figure 2A:
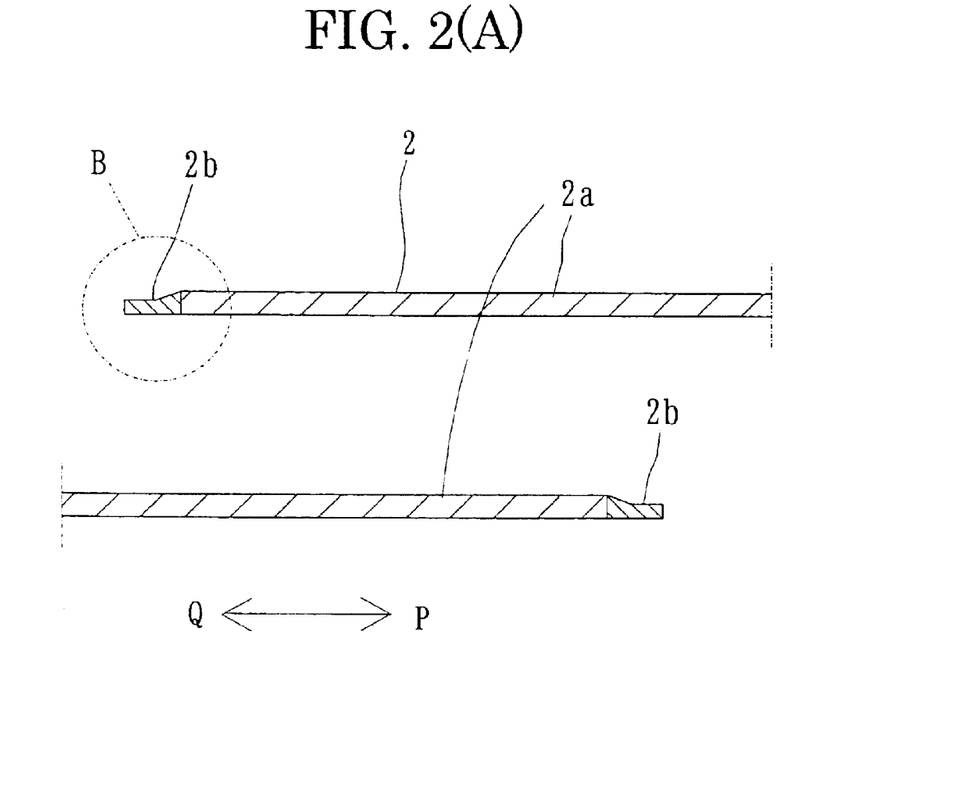
FIG. 2(A) is a cross-sectional view cut along the line II—II in FIG. 1
Figure 2B:
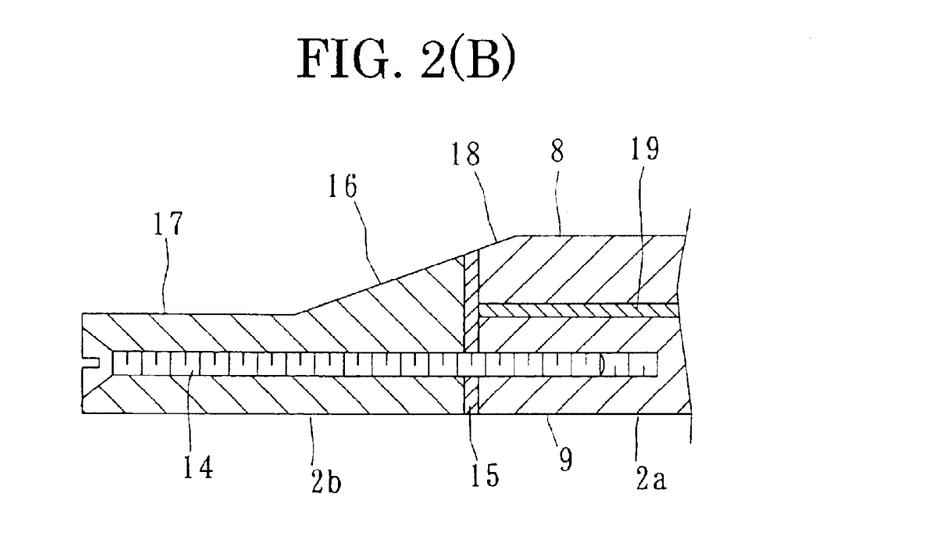
FIG. 2(B) is an enlarged view of a portion "B" of FIG. 2(A)

As shown in FIGS. 1, 2(A) and 2(B), a forming mold 2 for a lens sheet has a mold body 2a and a receiving member 2b surrounding the mold body 2a.

The mold body 2a has a molding plate 8 and a supporting plate 9. The molding plate 8, which has a relatively small thickness, is adhered on the supporting plate 9.

Figure 3A:
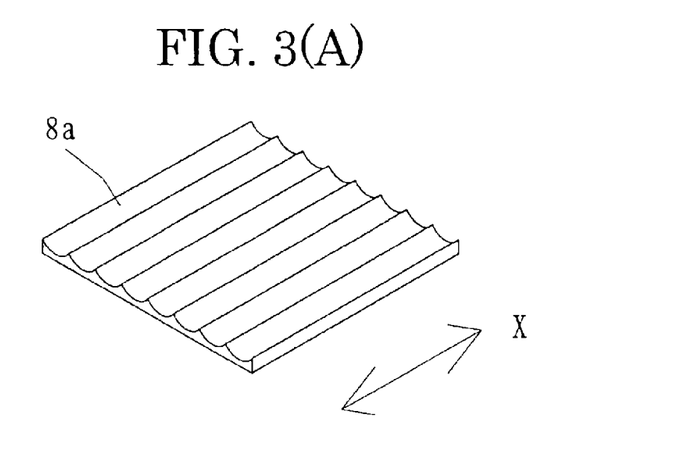
FIGS. 3(A) to 3(C) are perspective views illustrating molding plates for various lens sheets.
Figure 3B:
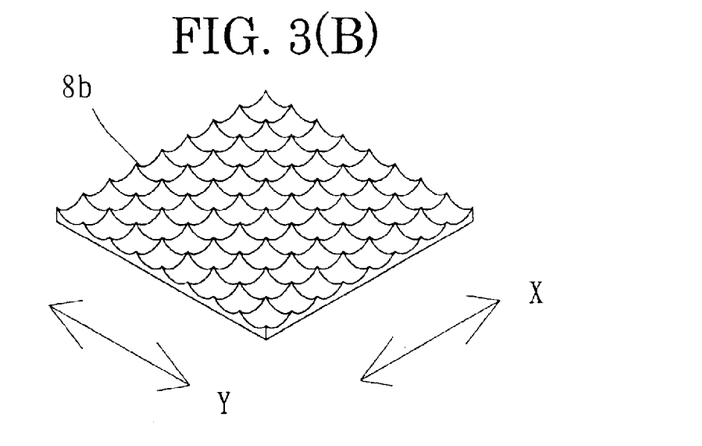
Figure 3C:
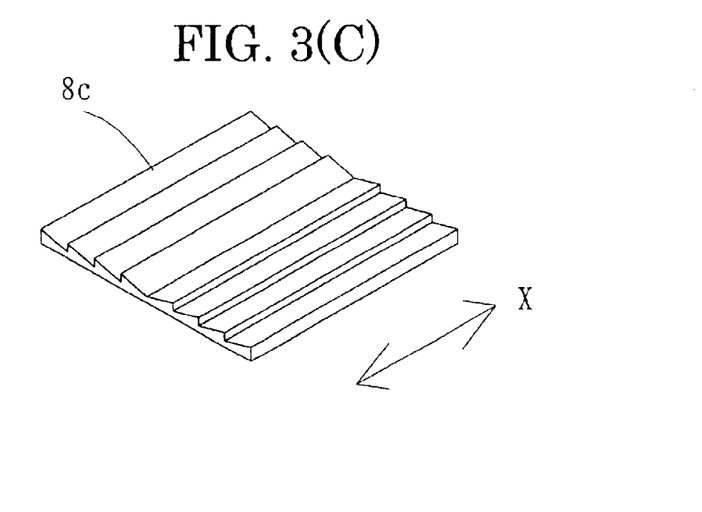

The molding plate 8 is a rectangular plate having a relatively small thickness, on which lens formation grooves are formed. What is shown in FIGS. 1, 2(A) and 2(B) is the molding plate 8 to form a Fresnel lens. The molding plate is not limited only to such a plate 8, but may be for example a molding plate 8a as shown in FIG. 3(A), which is used to form a lenticular lens, a molding plate 8b as shown in FIG. 3(B), which is used to form a compound eye-type lens and a molding plate 8c as shown in FIG. 3(C), which is used to form a linear Fresnel lens.

The molding plate 8 as shown in FIG. 1 is manufactured by carrying out the following steps.

First, a metallic blank plate prepared is subjected to a cutting work utilizing a cutting machine to form lens formation grooves for forming a Fresnel lens on the surface of the metallic blank plate to form a master plate. Then, a mother plate is prepared utilizing the above-mentioned master plate in accordance with an electroforming method. The mother plate, which is formed of nickel or the like, has the same shaped grooves as the Fresnel lens. A blank stamper, which is formed of nickel or the like, is prepared utilizing the above-mentioned mother plate in accordance with the electroforming method. The blank stamper thus prepared is cut at its four sides to obtain the molding plate 8 serving as a rectangular stamper.

Applying a cutting work to the blank plate to form the same shaped grooves as the Fresnel lens on the blank plate makes it possible to obtain immediately the molding plate 8 serving as the stamper without preparing the mother plate. The master plate may be used as the molding plate 8 in place of the stamper. In such a case, the master plate is cut at its four sides along four cutting lines.

The other molding plates 8a, 8b, 8c are also prepared in the same manner as described above.

The supporting plate 9, which is formed of a metallic plate such as an aluminum plate, serves as a reinforcing member for imparting a sufficient rigidity to the molding plate 8, i.e., the stamper having a relatively small thickness. In case where the master plate 11 is used as the molding plate 8, the above-mentioned supporting plate 9 may be omitted. The master plate 11 may be formed of a plate having a relatively large thickness so as to possess prescribed strength and rigidity. In such a case, the supporting plate 9 may be unnecessary.

The receiving member 2b is formed of metal such as copper, brass and aluminum into an elongated plate. Such a receiving member 2b is put on each of the four sides of the mold body 2a and secured thereon as shown in FIG. 1. The four receiving members 2b are therefore used in the embodiment. More specifically, each of the four receiving members 2b is fixed to the four sides of the supporting plate 9 of the forming mold 2 by means of a plurality of setscrews 14 serving as fasteners. Such a structure reinforces the molding plate 8 with the receiving members 2b through the supporting plate 9, thus providing a sufficient rigidity.

The contacting surfaces of the receiving member 2b and the forming mold 2 are formed into a perpendicular plane to the basic plane, i.e., the horizontal plane of the forming mold 2 so as to prevent an inappropriate gap from being formed between these contacting surfaces, as shown in FIG. 2(B). Filler 15 is applied between the contacting surfaces of the mold body 2a and the receiving member 2b, as an occasion demands. This makes it possible to prevent a superfluous amount of resin 3a of ionizing radiation curing type resin 3 as applied onto the molding plate 8 from coming into the gap between the contacting surfaces of the receiving member 2b and the mold body 2a.

The ionizing radiation curing type resin 3 in the form of liquid is applied onto the forming mold 2, a substrate is placed thereon and then the substrate 4 and the resin 3 are pressed against the forming mold 2 by means of a pair of pressing rollers 5a, b from a pressing-starting side P to a pressing-finishing side Q, as described below, thus molding the ionizing radiation curing type resin 3 into a lens (see FIGS. 5(A) to 5(G)). A superfluous amount of resin 3a of the ionizing radiation curing type resin 3 flows from the periphery of the forming mold 2 during the pressing step utilizing the pressing rollers 5a, 5b. The receiving member 2b is provided at its portion, which comes into contact with the mold body 2a, with a downward inclined upper surface 16 in a direction from the mold body 2a to the receiving member 2b. Such an inclined upper surface 16 receives the superfluous amount of resin 3a so as to keep the resin 3a away from an area, which actually forms the lens sheet 1 as the finished product, and prevent it from falling down. In addition, the receiving member 2b has an upper flat surface 17 extending from the outer edge of the inclined upper surface. Providing an upward projection in place of the inclined upper surface 16 causes useless pieces of the cured resin to be left easily on the forming mold 2, when carrying out a step for removing the lens sheet 1 from the forming mold 2 as described later. It is therefore preferable to provide such an inclined upper surface 16 to solve the above-mentioned problem. The superfluous amount of resin 3a, which is squeezed out between the forming mold 2 and the substrate 4, flows smoothly and rapidly on the inclined upper surface 16 so as to be kept away from the molding plate of the forming mold 2 to stay on the upper flat surface 17. In addition, the mold body 2a is provided at its portion, which comes into contact with the receiving member 2b, with a downward inclined upper surface 18 in a direction from the mold body 2a to the receiving member 2b. The downward inclined upper surface 18 of the mold body 2a continuously extends to the downward inclined upper surface 16 of the receiving member to form a single flat surface. Such a structure ensures a further smooth flow of the superfluous amount of resin 3a.

The receiving member 2b is provided on at least the pressing-finishing side Q of the periphery of the mold body 2a. More specifically, there may be a case where applying the ionizing radiation curing type resin 3 on the mold body 2a in the minimum amount cause the superfluous amount of resin 3a, which flow due to the pressing operation of the pressing rollers 5a, 5b, to appear only on the pressing-starting side of the mold body 2a. In such a case, provision of the receiving member 2b only on the pressing-starting side Q of the mold body 2 suffices. The receiving member 2b may be additionally provided also on the pressing-starting side P of the forming mold 2, and further on the opposite sides in a perpendicular direction to the traveling direction of the forming mold 2, according as an amount of the ionizing radiation curing type resin 3 to be applied on the mold body 2a increases.

Now, description will be given below of a method for manufacturing the forming mold having the above-described structure.

Figure 4A:
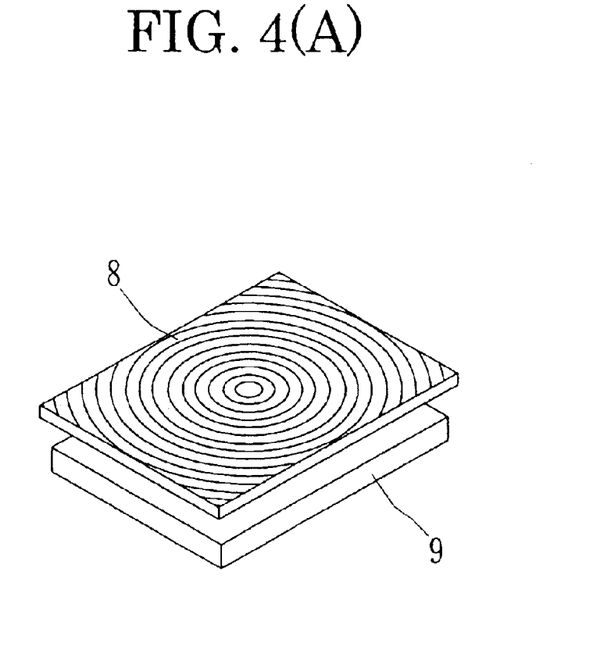
FIGS. 4(A) to 4(D) are schematic views illustrating steps for manufacturing the forming mold.
Figure 4B:
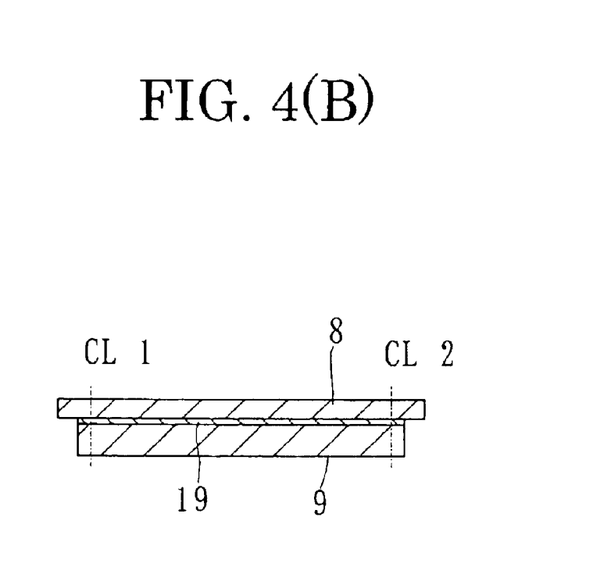
Figure 4C:
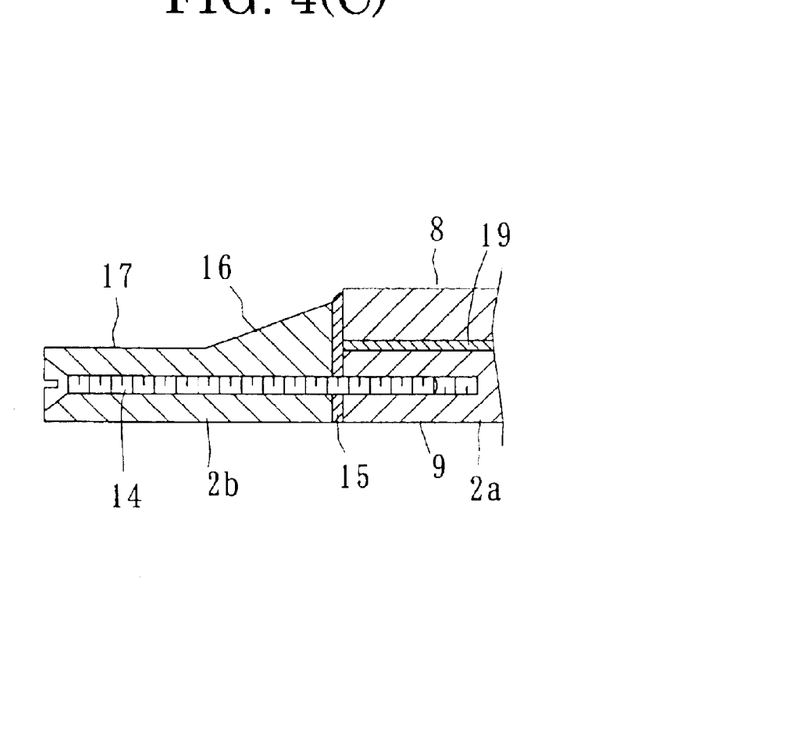
Figure 4D:
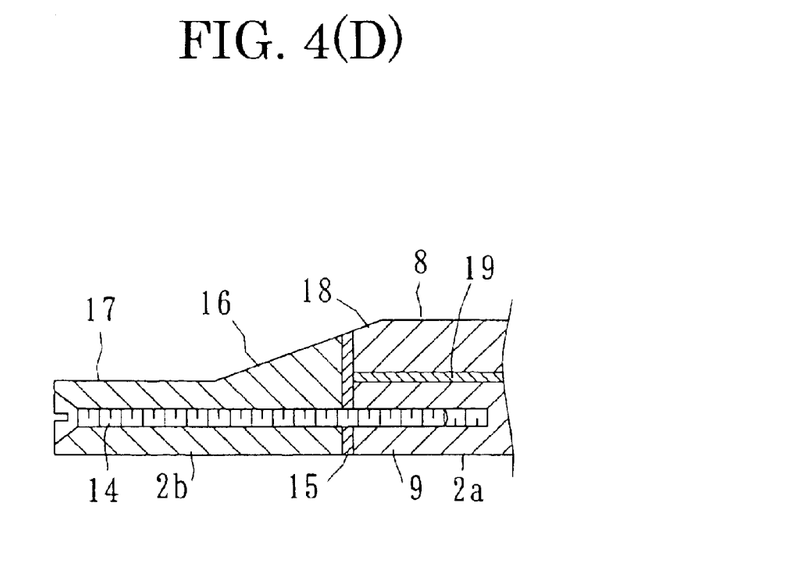

The molding plate 8 is placed on the upper surface of the supporting plate 9, on which adhesive has been applied as shown in FIG. 4(A). The molding plate 8 and the supporting plate 9 are pressed to each other by means of a pressing machine. After completion of adhesion of the molding plate 8. and the supporting plate 9, a blank body is obtained. The blank body is subjected to a cutting step to cut the opposite sides along the cutting lines CL1, CL2 in chain lines in FIG. 4(B). The similar cutting step is applied to the remaining opposite sides of the blank body to prepare the mold body 2a having on its periphery four perpendicular surfaces. Filler 15 such as sealant is applied onto these perpendicular surfaces, as an occasion demands. The receiving member 2b is fitted onto each of the perpendicular surfaces of the mold body 2a and fixed to the supporting plate 9 of the mold body 2a by the setscrews 14 to prepare a mold unit (see FIG. 4(C)). The thus prepared mold unit is subjected to a cutting work to form the downward inclined upper surface 18 in a direction from the mold body 2a to the receiving member 2b at the connection portion of the mold body 2a and the receiving member 2b (see FIG. 4(D)). The cutting work is carried out for each of the four sides of the mold unit, thus preparing the forming mold 2.

Now, description will be given below of a method for manufacturing a lens sheet such as a Fresnel lens sheet with the use of the forming mold having the above-described structure with reference to FIGS. 5(A) to 5(G).

As shown in FIGS. 5(A) to 5(G), the lens sheet 1 is manufactured by carrying out a temperature adjusting step (A) for make adjustment of temperature of the forming mold 2 for the lens sheet 1 to a prescribed temperature, which is suitable to formation of the lens sheet 1; the first resin-application step (i.e., the full-surface application step) (B) for applying ionizing radiation curing type resin 3 in the form of liquid on the entirety of the upper surface of the mold body 2a of the forming mold 2, to which the above-mentioned temperature adjusting step (A) has been applied, to form the first uncured resin layer; the second resin-application step (i.e., the partial-surface application step) (C) for applying the ionizing radiation curing type resin 3 in the form of liquid on one side, i.e., the pressing-starting side P of the first uncured layer, which has been applied on the mold body 2a, to form an uncured resin pool; a substrate supplying step (D) for placing the substrate 4, through which ionizing radiation permeates, on the first uncured resin layer and the uncured resin pool from above the forming mold 2; a laminating step (E) for pressing the substrate 4 and the forming mold 2 from the pressing-starting side P toward the pressing-finishing side Q by means of a pair of pressing rollers 5a, 5b to spread the uncured resin pool over the first uncured resin layer and flatten it, thereby forming the second uncured resin layer on the first uncured resin layer so as to provide a laminate structure of the first and second uncured resin layers and the substrate 4; a resin-curing step (F) for irradiating ionizing radiation onto the first and second uncured resin layers through the substrate 4 to cure them; and a removing step (G) for removing the ionizing radiation curing type resin 3 as cured from the forming mold 2 together with the substrate 4.

Figure 5A:
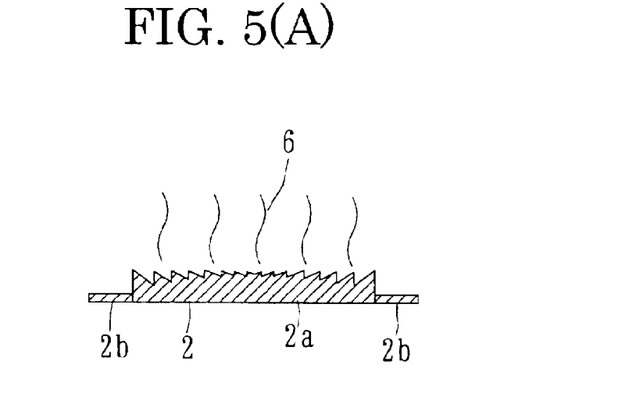
FIGS. 5(A) to 5(G) are schematic views illustrating steps for manufacturing the lens sheet with the use of the forming mold.

The temperature-adjusting step (A) is to heat uniformly the forming mold 2 to a temperature, which is suitable to formation of the lens sheet. The step (A) is carried out for example by blowing hot air 6 heated by an electric heater, dried vapor or the like on the forming mold 2 in a prescribed period of time. The blowing step of the hot air 6 may be applied uniformly to the entirety of the forming mold 2, or in a manner that a flow rate of the hot air 6 is increased for a local portion, which is apt to be cooled.

Figure 5B:
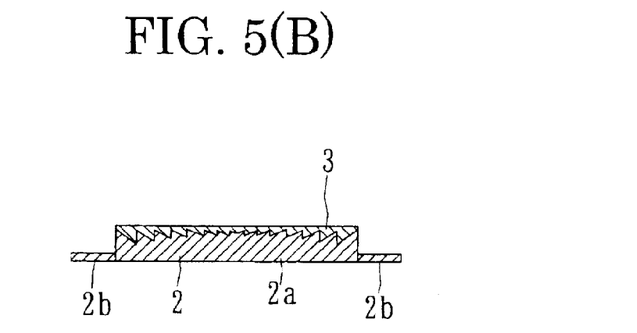

The first resin-application step (i.e., the full-surface application step) (B) is to apply the ionizing radiation curing type resin 3 in the form of liquid on the entirety of the upper surface of the forming mold 2, to which the temperature-adjusting step (A) has been applied, to form the first uncured layer. In such a step (B), the ionizing radiation curing type resin 3 is poured in the form of liquid on the forming mold 2 for example through a single nozzle or a plurality of nozzles. Application of the ionizing radiation curing type resin 3 in the form of liquid is conducted, while one or both of the forming mold 2 and the nozzle is traveled. It is preferable to apply the ionizing radiation curing type liquid resin 3 on the forming mold 2 from one side thereof to the other side thereof, while pouring the resin 3 in the form of threads from a plurality of nozzles each having a small discharging opening. This makes it possible to prevent air from being entrapped into lens formation grooves on a lens formation surface, i.e., a molding surface of the forming mold 2. The ionizing radiation curing type resin 3 in the form of liquid is applied on the forming mold 3 in an amount, which is slightly larger than the actually required amount.

Ultraviolet ray curing type resin, electron beam curing type resin or the like may be used as the ionizing radiation curing type liquid resin 3.

Figure 5C:
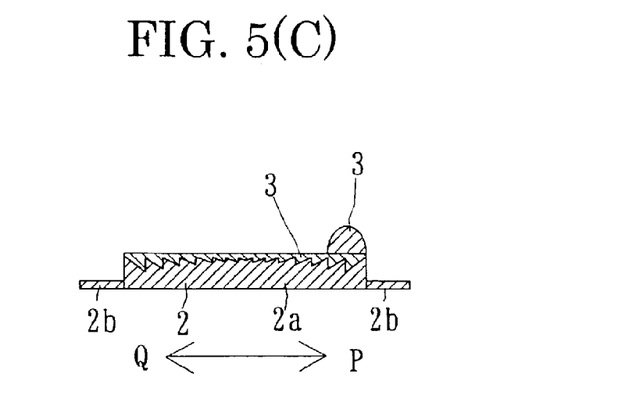

The second resin-application step (i.e., the partial-surface application step) (C) is to apply the ionizing radiation curing type liquid resin 3 on one side, i.e., the pressing-starting side P of the first uncured layer, which has been applied on the forming mold 2, to from an uncured resin pool on the pressing-starting side P. The ionizing radiation curing type liquid resin is poured on the forming mold 2 through the same single nozzle or plurality of nozzles as in the first resin-application step (B) or an ordinary single nozzle to form the uncured resin pool. The second resin-application step (C) may be omitted as an occasion demands.

Figure 5D:
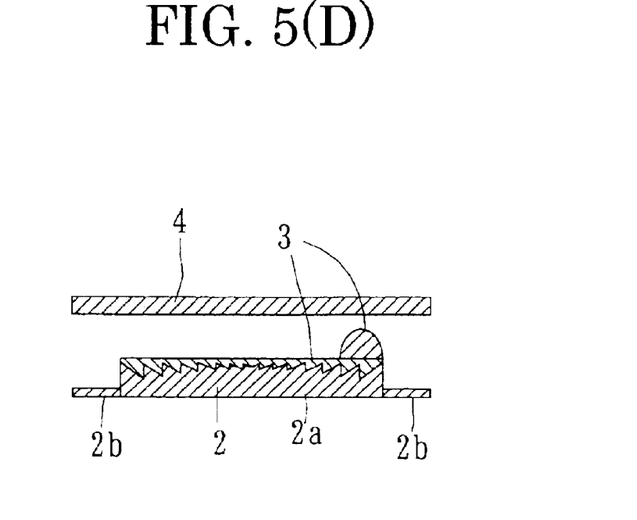

The substrate supplying step (D) is to place a substrate 4 on the first uncured resin layer and the uncured resin pool of the ionizing radiation curing type resin 3 from above the forming mold 2. For example, a plurality of suction cups disposed on a plane suck the substrate 4 having a sheet-shape and are moved to carry the substrate 4 on the forming mold 2 on which the first uncured resin layer and the uncured resin pool of the ionizing radiation curing type resin 3 have been formed. The sucking action of the suction cups is released so that the substrate 4 drops on the first uncured resin layer and the uncured resin pool of the ionizing radiation curing type resin 3, thus adhering on the surface of the ionizing radiation curing type resin 3.

The substrate 4 is formed of a transparent thin sheet such as an acrylic resin sheet through which ionizing radiation such as ultraviolet ray or electron beam permeates.

Figure 5E:
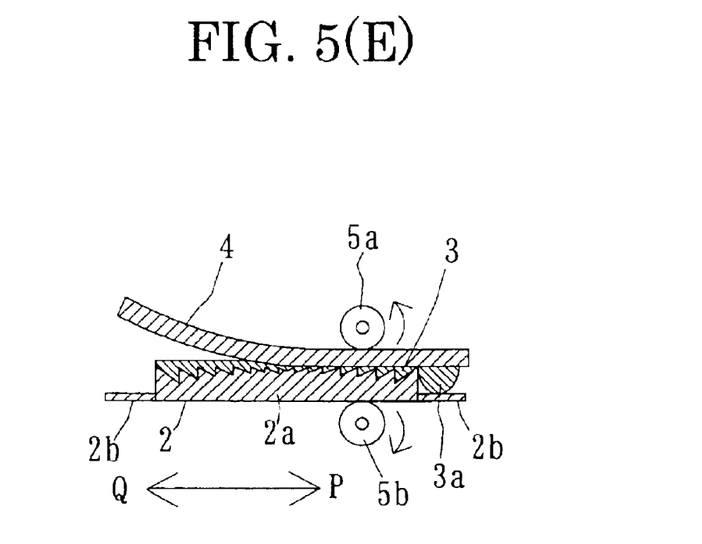

The laminating step (E) is to press the substrate 4 against the first uncured resin layer and the uncured resin pool of the ionizing radiation curing type resin 3 on the forming mold 2 from the pressing-starting side toward the pressing-finishing side. More specifically, the forming mold 2 on which the first uncured resin layer and the uncured resin pool of the ionizing radiation curing type resin 3 have been formed and then the substrate 4 has been placed thereon, is passed between a pair of pressing rollers 5a, 5b to spread the uncured resin pool over the first uncured resin layer, so as to form the second uncured resin layer on the first uncured resin layer. As a result, the first uncured resin layer and the second uncured resin layer are combined into a united layer having a uniform thickness. The uncured resin pool of the ionizing radiation curing type resin 3 applied in accordance with the second resin-application step (C) is spread over the first uncured resin layer from the pressing-starting side toward the pressing-finishing side so as to press bubbles out of the ionizing radiation curing type resin 3, thus preventing bubbles from being entrapped between the substrate 4 and the forming mold 2. In such a lamination step (E), a superfluous amount of resin 3a flows from between the forming mold 2 and the substrate 4. The superfluous amount of resin 3a smoothly flows on the inclined upper surfaces 18, 16 so as to be kept away from the molding plate of the forming mold 2 to stay on the upper flat surface 17 of the receiving member 2b, which continuously extends from the above-mentioned inclined upper surface 16. There may be a case where the superfluous amount of resin 3a stays on the inclined upper surfaces 18, 16, but causing no adverse effect so long as the superfluous amount of resin 3a is kept away from the molding plate 8 of the forming mold 2.

Figure 5F:
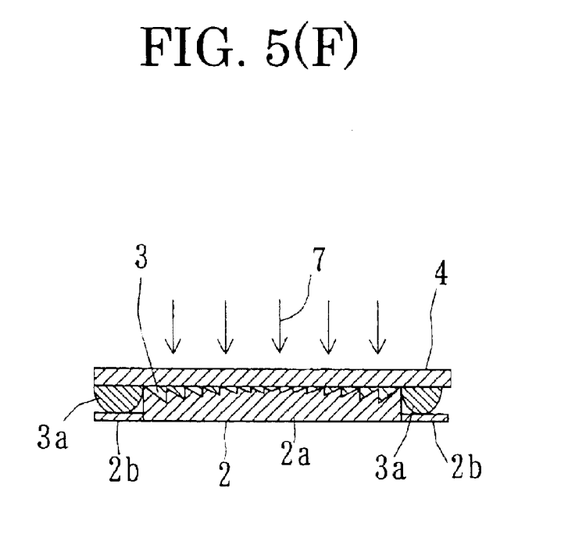

The resin-curing step (F) is to irradiate ionizing radiation onto the first and second uncured resin layers through the substrate 4 to cure them. More specifically, a radiation source such as an ultraviolet ray lamp is disposed above the forming mold 2 to irradiate uniformly ionizing radiation 7 on the substrate 4. The ionizing radiation 7, which permeates through the substrate 4, acts on the ionizing radiation curing type resin 3 applied on the forming mold 2 to cure it. The ionizing radiation curing type resin 3 as cured adheres firmly to the substrate 4.

Figure 5G:
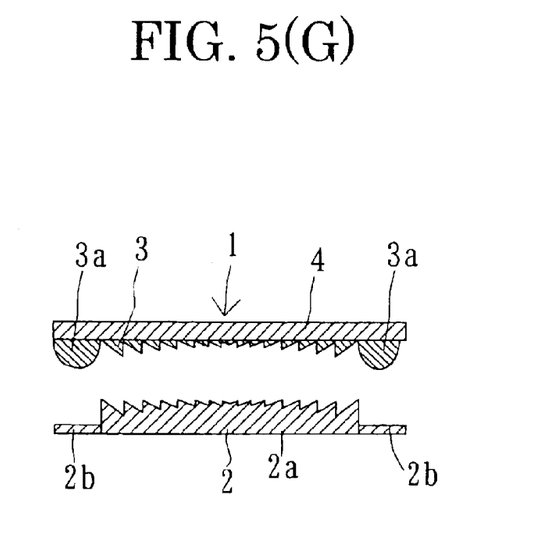

The removing step (G) is to remove the ionizing radiation curing type resin 3 as cured thorough irradiation of the ionizing radiation 7 from the forming mold 2 together with the substrate 4. More specifically, in case where a Fresnel lens is manufactured as the lens sheet 1, the following operations are carried out. First, the central portion of the substrate 4 is urged against the forming mold 2 and the opposite portions placed along a diagonal line of the lens sheet 1 are caught and lifted up. Accordingly, the ionizing radiation curing type resin 3 is peeled from the forming mold 2 from the vicinities to the opposite portions toward the central portion. Then, the opposite portions placed along the diagonal line of the substrate 4 are moved down on the forming mold 2. The other opposite portions placed along the other diagonal line of the substrate 4 are caught and lifted up. Accordingly, the ionizing radiation curing type resin 3 is peeled from the forming mold 2 from the vicinities to the other opposite portions toward the central portion. Finally, all the two pairs of opposite portions are caught and lifted up simultaneously so that the whole ionizing radiation curing type resin 3 is completely peeled from the forming mold 2.

Sharp irregularities exist on the bottom of the lens formation grooves or between the adjacent lens formation grooves on the Fresnel lens formation surface of the forming mold 2, as shown in FIGS. 5(A) to 5(G). Operations of catching one side or corner of the substrate and peeling it toward the other side or corner may damage the irregularities of the Fresnel lens formed of the ionizing radiation curing type resin 3, thus degrading performance of the lens. The above-described removing step however makes it possible to prevent the irregularities of the Fresnel lens formed of the ionizing radiation curing type resin 3 from being damaged by the forming mold 2. A part of the superfluous amount of resin 3a that adheres on the peripheral portion of the lower surface of the substrate 4, by which peripheral portion the area actually forming the lens sheet 1 is surrounded, is also cured. The thus cured part of the superfluous amount of resin 3a is peeled off simultaneously, when the portion having the lens sheet 1 is removed from the molding surface of the forming mold 2.

In case where a lenticular lens, a compound eye-type lens or a liner Fresnel lens is manufactured with the use of the molding plate 8a, 8b or 8c therefore as shown in FIGS. 3(A), 3(B) or 3(C), respectively, the peeling operation is carried out in a lens-direction, i.e., the longitudinal direction of respective lens-pieces for the lenticular lens or the linear Fresnel lens (namely, in a direction X in FIGS. 3(A) or 3(C)), or in a lens-orientation direction of respective lens-pieces for the compound eye-type lens (namely, in a direction X or Y in FIG. 3(B)).

Figure 6A:
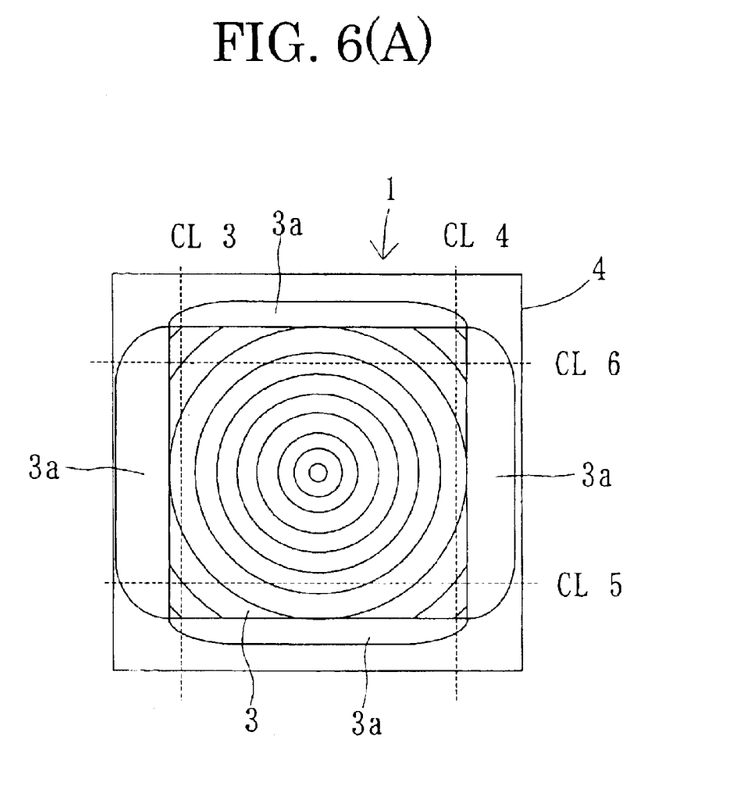
FIGS. 6(A) and 6(B) are schematic views illustrating a cutting step for the lens sheet.
Figure 6B:
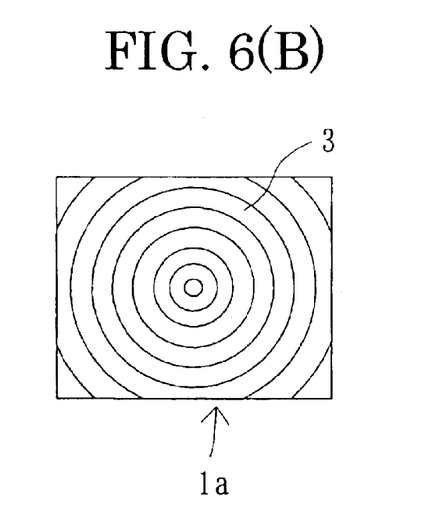

The Fresnel lens sheet 1 can be prepared by carrying out all of the steps (A) to (G). The substrate 4 of the Fresnel lens sheet 1 has the superfluous amount of ionizing radiation curing type resin 3, which has extended from the four sides of the forming mold 2 to adhere on the substrate 4 and been cured, as shown in FIG. 6(A). Cutting operations of useless end portions having the superfluous amount of ionizing radiation curing type resin 3 are applied, as an occasion demands, to the lens sheet 1 along cutting lines CL3, CL4, CL5 and CL6 as shown in FIG. 6(A) to remove the useless end portions, thus obtaining the lens sheet 1a as the finished product as shown in FIG. 6(B).

In the first aspect of the present invention as described in detail, the forming mold of the present invention for a lens sheet, which is to be used for molding ionizing radiation curing type resin into the lens sheet by applying said resin in a form of liquid on an upper surface of said forming mold, placing a substrate on said resin and pressing said substrate and said resin against said forming mold from a pressing-starting side of said forming mold to a pressing-finishing side thereof by means of a pressing roller, comprises: a mold body; and a receiving member for receiving a superfluous amount of the ionizing radiation curing type resin, said receiving member being provided on at least said pressing-finishing side of a periphery of said mold body. According to the above-mentioned features of the first aspect of the present invention, the receiving member receives a superfluous amount of resin, which flows outside between the forming mold and the substrate. The superfluous amount of resin, which is received by the receiving member, is cured together with the resin as applied on the mold body so that the superfluous amount of resin cured is peeled from the forming mold together with the lens sheet as the finished product. It is therefore possible to prevent formation of the next lens sheet from being disturbed by the superfluous amount of resin and a traveling passage for the forming mold and the other equipment from becoming dirty.

In the second aspect of the present invention, said mold body may comprise a molding plate and a supporting plate on which said molding plate is secured. According to such a feature, the supporting plate and the receiving member impart a sufficient rigidity to the molding plate, thus reinforcing the molding plate.

In the third aspect of the present invention, a gap between said mold body and said receiving member may be filled with filler. According to such a feature, the filler prevents a superfluous amount of resin from coming into the gap between the mold body and the receiving member. This prevents the superfluous amount of resin from being left inappropriately on the forming mold after the lens sheet is peeled therefrom.

In the fourth aspect of the present invention, said receiving member may have a portion, which comes into contact with said mold body, said portion has a downward inclined upper surface in a direction from said mold body to said receiving member. According to such a feature, it is possible to cause the superfluous amount of resin to flow smoothly on the receiving member.

In the fifth aspect of the present invention, said mold body may have a portion, which comes into contact with said receiving member, said portion having a downward inclined upper surface in a direction from said mold body to said receiving member. According to such a feature, it is possible to cause the superfluous amount of resin to flow smoothly on the receiving member.

In the sixth aspect of the present invention, the method of the present invention for manufacturing a forming mold for a lens sheet, comprises the steps of: cutting four sides of a blank body having a basic plane in a direction perpendicular to said basic plane to prepare a mold body having on a periphery thereof four perpendicular side surfaces; and securing a receiving member on at least one of said four perpendicular side surfaces of said mold body to prepare a mold unit, said one of said four perpendicular side surfaces being located on a pressing-finishing side. According to the above-mentioned features of the sixth aspect of the present invention, the four sides of the blank body are cut in the direction perpendicular to the basic plane of the blank body so as to provide the mold body having the four perpendicular side surfaces. It is therefore possible to make a gap between the perpendicular side surface of the mold body and the receiving member small, thus preventing the superfluous amount of resin from being left on the forming mold.

In the seventh aspect of the present invention, said mold body may comprise a molding plate and a supporting plate on which said molding plate is adhered. According to such a feature, the supporting plate and the receiving member impart a sufficient rigidity to the molding plate, thus reinforcing the molding plate.

In the eighth aspect of the present invention, the method may further comprise subjecting said mold unit to a cutting work to form a downward inclined upper surface in a direction from said mold body to said receiving member at a connection portion of said mold body and said receiving member. According to such a feature, it is possible to cause the superfluous amount of resin to flow smoothly and rapidly on the receiving member.

In the ninth aspect of the present invention, the method may further comprise applying filler in a gap between said mold body and said receiving member prior to said securing of said receiving member. According to such a feature, it is possible to seal the gap between the mold body and the receiving member in an appropriate manner.

The entire disclosure of Japanese Patent Application No. 2000-355359 filed on Nov. 22, 2000 including the specification, claims, drawings and summary is incorporated herein by reference in its entirety.

What is claimed is:

1. A forming mold for a lens sheet, which is to be used for molding ionizing radiation curing type resin into the lens sheet by applying said resin in a form of liquid on an upper surface of said forming mold, placing a substrate on said resin and pressing said substrate and said resin against said forming mold from a pressing-starting side of said forming mold to a pressing-finishing side thereof by means of a pressing roller, comprising:

a mold body; and a receiving member for receiving a superfluous amount of the ionizing radiation curing type resin, said receiving member being provided on at least said pressing-finishing side of a periphery of said mold body, a gap between said mold body and said receiving member is filled with filler, and said mold body having a portion, which comes into contact with said receiving member, said portion having a downward inclined upper surface in a direction from said mold body to said receiving member.

2. The forming mold as claimed in claim 1, wherein:

said receiving member has a portion, which comes into contact with said mold body, said portion having a downward inclined upper surface in a direction from said mold body to said receiving member.

* * * * *